(12) United States Patent
Ioki et al.

(10) Patent No.: US 7,432,996 B2
(45) Date of Patent: Oct. 7, 2008

(54) HOUSING FOR IMAGE DISPLAY DEVICE HAVING LIQUID CRYSTAL DISPLAY PANEL AND MICRO-PATTERNED RETARDER BONDED AT SPECIFIC LOCATION

(75) Inventors: Sadao Ioki, Kiryu (JP); Sanji Arisawa, Joetsu (JP); Seijiro Tomita, Komae (JP)

(73) Assignees: Sophia Inc., Gunma (JP); Arisawa Mfg. Co., Ltd., Niigata (JP)

( * ) Notice: Subject to any disclaimer, the term of this patent is extended or adjusted under 35 U.S.C. 154(b) by 610 days.

(21) Appl. No.: 10/545,028

(22) PCT Filed: Feb. 6, 2004

(86) PCT No.: PCT/JP2004/001286

§ 371 (c)(1),
(2), (4) Date: Aug. 10, 2005

(87) PCT Pub. No.: WO2004/072708

PCT Pub. Date: Aug. 26, 2004

(65) Prior Publication Data

US 2006/0146202 A1    Jul. 6, 2006

(30) Foreign Application Priority Data

Feb. 12, 2003    (JP) ............................... 2003-033584

(51) Int. Cl.
*G02F 1/1333* (2006.01)
(52) U.S. Cl. ........................... 349/58; 349/117; 349/122
(58) Field of Classification Search .................. 349/58; 348/739, 836; 248/917
See application file for complete search history.

(56) References Cited

U.S. PATENT DOCUMENTS

| | | | |
|---|---|---|---|
| 2004/0240777 A1* | 12/2004 | Woodgate et al. | 385/16 |
| 2005/0285997 A1* | 12/2005 | Koyama et al. | 349/117 |
| 2007/0030412 A1* | 2/2007 | Park | 349/58 |

FOREIGN PATENT DOCUMENTS

| | | |
|---|---|---|
| JP | 55-51783 U | 4/1980 |
| JP | 8-338990 A | 12/1996 |
| JP | 9-50030 A | 2/1997 |
| JP | 10-063199 | 3/1998 |
| JP | 10-63199 A | 3/1998 |
| JP | 2000-197073 A | 7/2000 |
| JP | 2002-14301 A | 1/2002 |

* cited by examiner

*Primary Examiner*—Andrew Schechter
*Assistant Examiner*—Nathanael R Briggs
(74) *Attorney, Agent, or Firm*—Sughrue Mion, PLLC

(57) ABSTRACT

The present invention is intended to improve assembleability of a portion of a liquid crystal display panel. In an image display system for displaying images by allowing a light irradiated from behind to be transmitted therethrough, a liquid crystal display panel unit (227) includes a liquid crystal display panel (252) having a polarizing plate (251) at least on the back surface thereof and a micro-patterned retarder (253) mounted to the rear surface of the polarizing plate (251) on the back surface of the liquid crystal display panel (252), and the liquid crystal display panel unit (227) and a diffuser panel (226) to be disposed in front thereof can be supported in the depressed state in the fore-and-aft direction by an upright wall (262) of a mounting base member (223) defining an opening section (260) in an area including the polarizing plates (250, 251) of the liquid crystal display panel (252).

4 Claims, 16 Drawing Sheets

HOUSING FOR IMAGE DISPLAY DEVICE HAVING LIQUID CRYSTAL DISPLAY PANEL AND MICRO-PATTERNED RETARDER BONDED AT SPECIFIC LOCATION

TECHNICAL FIELD

The present invention relates to an image display system and, more specifically, to a three-dimensional image display system in which a viewer can view a three-dimensional image without wearing specific eye-glasses.

RELATED ART

Hitherto, a three-dimensional image display system has a configuration such that a polarizing filter part for the right eye and a polarizing filter part for the left eye having the polarization directions intersecting orthogonally with each other are arranged on the left and right of the front surface of a light source, the respective light rays respective polarizing filter parts are made into parallel beams by a Fresnel lens, and irradiated on a liquid crystal display device, each linear polarizing filter line of the polarizing filters on either side of the liquid crystal display device having a polarization direction orthogonal to both polarization directions of an adjacent filter line, and corresponding polarizing filter line of the other side polarizing filter, whereby the video information for the right eye and the left eye is alternately displayed by each of the one horizontal line in compliance with the light transmission lines of the two polarizing filters on liquid crystal panels of the liquid crystal display devices. Also, the polarization filter on the light source side is adapted to have the linear polarizing filter line parts being respectively intersected orthogonally with each other at every one horizontal line and being alternately arranged, and the polarization filter on the observation side is adapted to be a linear polarization filter which has one of the linear polarizing filter line parts on the polarizing filter on the light source side, whereby the video information for the right eye and the left eye is alternately displayed by each of the one horizontal line in compliance with the light transmission lines of the polarizing filters on the light source side on the liquid crystal panels of the liquid crystal display devices (for example, Patent Document 1).

[Patent Document 1]
JP-A-10-63199

However, it is difficult to form the linear polarizing filter line parts in which the polarization axes are orthogonal with each other at every one horizontal line of the liquid crystal panel as in the related art.

Such a filter is actually disposed by combining a plate or the like for changing the phase of light with respect to one linear polarizing filter.

On the other hand, when combining them, it is necessary to dispose and support the same with the relative positions adjusted. Also, in this case, since the plate or the like is mounted to the liquid crystal panel with the intermediary of the polarizing filter, if they are not supported adequately, displacement or damage of the plate or the like may be resulted.

The present invention is intended to solve the above-described problems.

DISCLOSURE OF THE INVENTION

A first aspect of the invention is an image display system for displaying images by allowing a light irradiated from behind to be transmitted therethrough including: a front structure for allowing the light to be transmitted therethrough for displaying images; and a rear structure having a light source for emitting a light; the front structure including: a Fresnel lens; a liquid crystal display panel unit including a liquid crystal display panel with a polarizing plate disposed at least on the back surface thereof and a micro-patterned retarder to be mounted to the rear surface of the polarizing plate on the back surface of the liquid crystal display panel; a diffuser panel disposed on the front surface of the liquid crystal display panel unit; a mounting base member having an opening section of a predetermined size for mounting the Fresnel lens, the liquid crystal display panel unit and the diffuser panel; and a cover member for mounting the front surface side of the mounting base member, the mounting base member including an upright wall having a predetermined height formed with the opening section along the inner periphery of a frame, and a storage formed on the front surface side of the upright wall for storing the liquid crystal display panel unit and the diffuser panel, and a mounting portion for the Fresnel lens formed on the back surface side thereof, the cover member including an opening corresponding to the opening section, an abutting portion which abuts against the diffuser panel, the abutting portion formed on the outer peripheral area of the opening at a position opposing to the upright wall in a state in which the liquid crystal display panel unit and the diffuser panel are stored in the storage on the front surface side of the upright wall of the mounting base member and then mounted to the mounting base member, wherein the liquid crystal display panel unit and the diffuser panel can be supported in a depressed state in the fore-and-aft direction at an area including the polarizing plate of the liquid crystal display panel by the upright wall of the mounting base member and the abutting portion of the cover member, the liquid crystal display panel unit is formed with a contact area in which the micro-patterned retarder comes into contact with the polarizing plate disposed on the back surface of the liquid crystal display panel and a non-contact areas at end positions with the intermediary of the contact area which does not come into contact with the polarizing plate and opposes the liquid crystal display panel, and the liquid crystal display panel and the micro-patterned retarder are fixedly bonded to each other at predetermined portion in the non-contact areas.

In the first aspect of the invention, a second aspect of the invention is configured in such a manner that the rear structure includes a linear light-emitting source as the light source, a reflecting member, an enclosure for storing the linear light-emitting source and the reflecting member, the enclosure is formed with an upper space located behind the Fresnel lens and a lower space located below the upper space, the linear light-emitting source is provided in the lower space in the lateral direction with respect to the liquid crystal display panel so as to emit a light toward the reflecting member, the reflecting member is disposed at a predetermined angle so as to reflect the light from the linear light-emitting source toward the Fresnel lens, so that the linear light-emitting source is positioned at a location apart from the Fresnel lens at a predetermined distance via the reflecting member.

In the first aspect of the invention, a third aspect of the invention is configured in such a manner that the liquid crystal display panel unit is stored in the storage in a state in which the lower surface of the liquid crystal display panel is placed on the upper surface of the bottom plate of the storage, and in this state, the image display surface of the liquid crystal display panel is placed at a portion corresponding to the opening section formed on the mounting base member, and the polarizing plate and the micro-patterned retarder are mounted correspondingly.

In the second aspect of the invention, a fourth aspect of the invention is configured in such a manner that the liquid crystal display panel unit is stored in the storage in a state in which the lower surface of the liquid crystal display panel is placed on the upper surface of the bottom plate of the storage, and in this state, the image display surface of the liquid crystal display panel is placed at a portion corresponding to the opening section formed on the mounting base member, and the polarizing plate polarizing plate and the micro-patterned retarder are mounted correspondingly.

According to the first aspect of the invention, the invention includes the liquid crystal display panel unit including the liquid crystal display panel with the polarizing plate e disposed at least on the back surface thereof and the micro-patterned retarder to be mounted to the rear surface of the polarizing plate on the back surface of the liquid crystal display panel, the mounting base member including the upright wall having a predetermined height formed with the opening section along the inner periphery of the frame, the storage formed on the front surface side of the upright wall for storing the liquid crystal display panel unit and the diffuser panel and the mounting portion for the Fresnel lens formed on the back surface side thereof, the cover member including the opening corresponding to the opening section, the abutting portion which abuts against the diffuser panel, the abutting portion formed on the outer peripheral area of the opening at a position opposing to the upright wall in a state in which the liquid crystal display panel unit and the diffuser panel are stored in the storage on the front surface side of the upright wall of the mounting base member and then mounted to the mounting base member, whereby the liquid crystal display panel unit and the diffuser panel can be supported in a depressed state in the fore-and-aft direction at the area including the polarizing plate of the liquid crystal display panel by the upright wall of the mounting base member and the abutting portion of the cover member. Therefore, the liquid crystal display panel unit in which the micro-patterned retarder is mounted to the rear surface of the polarizing plate is adequately stored and supported, so that displacement or damage of the micro-patterned retarder due to the supporting state can be prevented.

Also, the liquid crystal display panel unit is formed with the contact area in which the micro-patterned retarder comes into contact with the polarizing plate which is disposed on the back surface of the liquid crystal display panel and the non-contact areas which do not come into contact with the polarizing plate and oppose the liquid crystal display panel at the end portions with the intermediary of the contact area, and the liquid crystal display panel and the micro-patterned retarder are fixedly bonded to each other at the predetermined portions in the non-contact areas. Therefore, with the supporting structure using the upright wall of the mounting base member and the abutting portion of the cover member in the depressing state, a phenomenon such that the micro-patterned retarder is detached, which occurs in the case where predetermined portions of the non-contact area are simply fixed, can be prevented, whereby the liquid crystal display panel and the micro-patterned retarder are sufficiently supported, and good assembleability of the micro-patterned retarder is achieved.

For example, in the case of fixedly adhering the adhering area (for example, the entire surface of the contact area), transmission of light through the display surface may be distorted according to the adhering state, and/or the workability is difficult. However, since the adhering portions are predetermined positions in the non-contact area, the workability is improved, and the light must not be transmitted through the adhesive agent on the image display surface, whereby piece-to-piece variations of display of the three-dimensional images among the image display systems are prevented.

According to the second aspect of the invention, the light source for three-dimensional image display can be arranged adequately and the depth of the system can be reduced to achieve a compact design, whereby the installability can be improved.

According to the third and fourth aspects of the invention, the liquid crystal display panel unit is stored in the storage of the mounting base member in a state in which the lower surface of the liquid crystal display panel is placed on the upper surface of the bottom plate of the storage, and in this state, the image display surface of the liquid crystal display panel is placed at the position corresponding to the opening section formed on the mounting base member, and the polarizing plate and the micro-patterned retarder are mounted correspondingly. Therefore, constantly stable storage is achieved and hence displacement between the opening section and the position where the image is displayed is eliminated, whereby the three-dimensional images can be provided adequately.

BEST MODE FOR CARRYING OUT THE INVENTION

Figure 1:
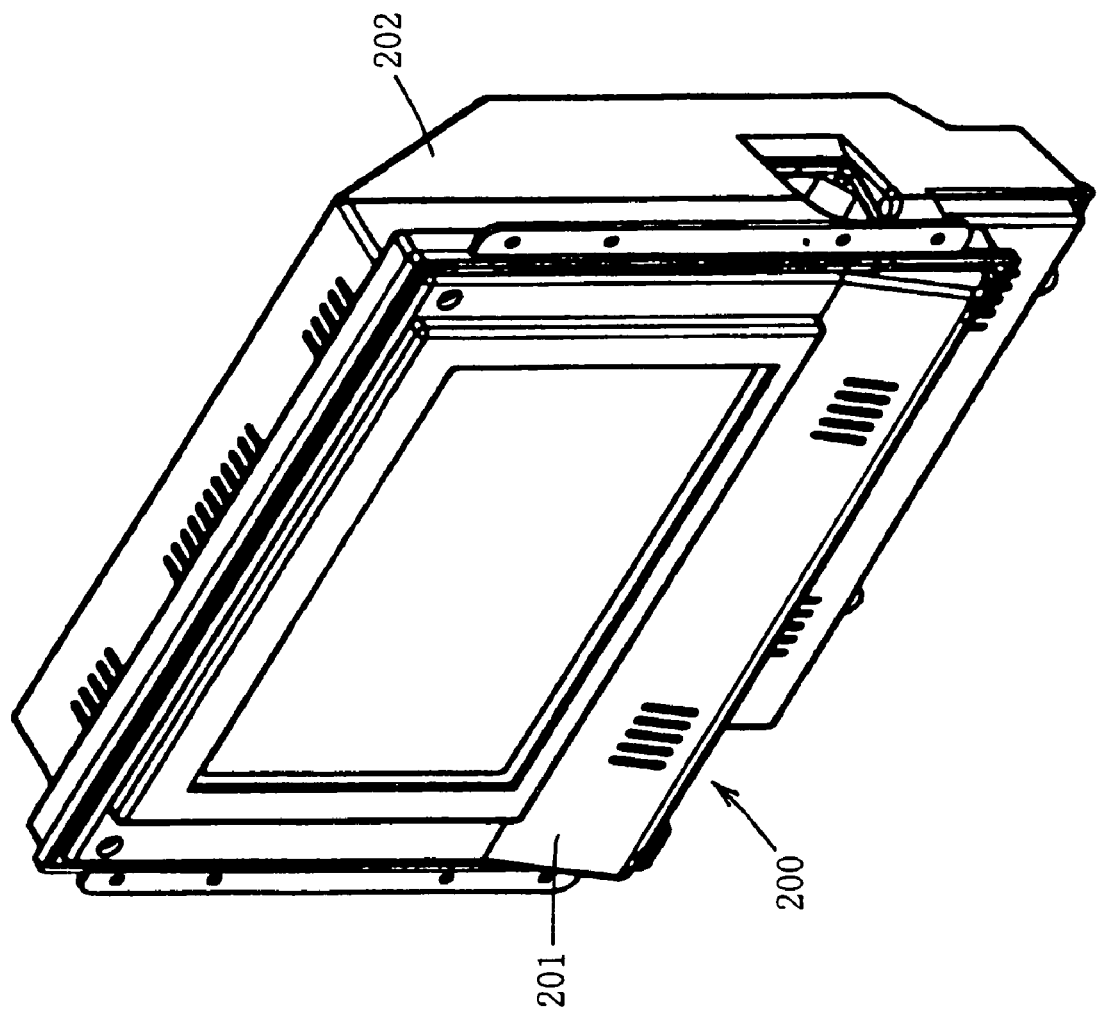
FIG. 1 is a perspective view of an image display box according to an embodiment of the present invention.

Referring now to the drawings, an embodiment of the present invention will be described.

Figure 2:
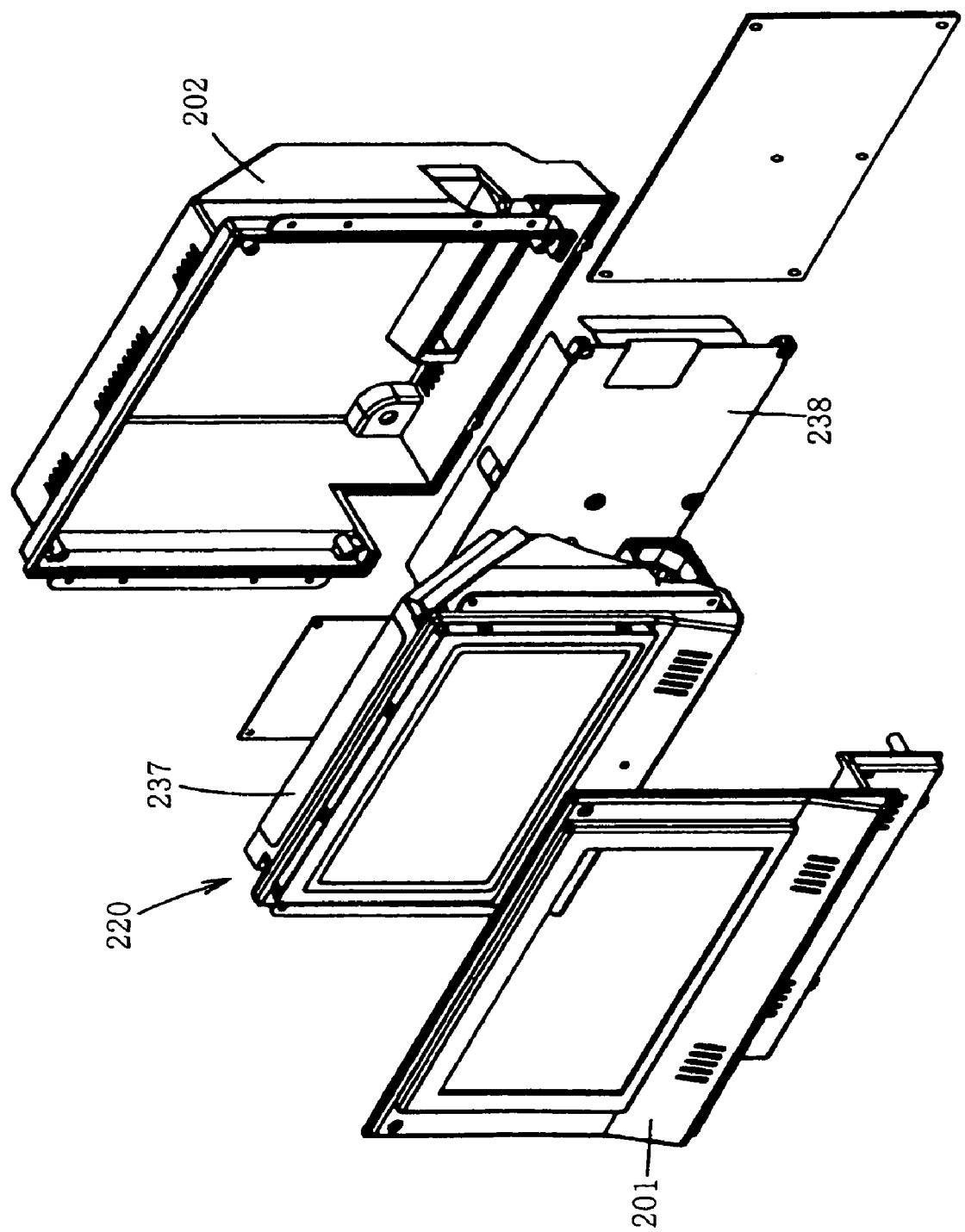
FIG. 2 is an exploded perspective view of the image display box.
Figure 3:
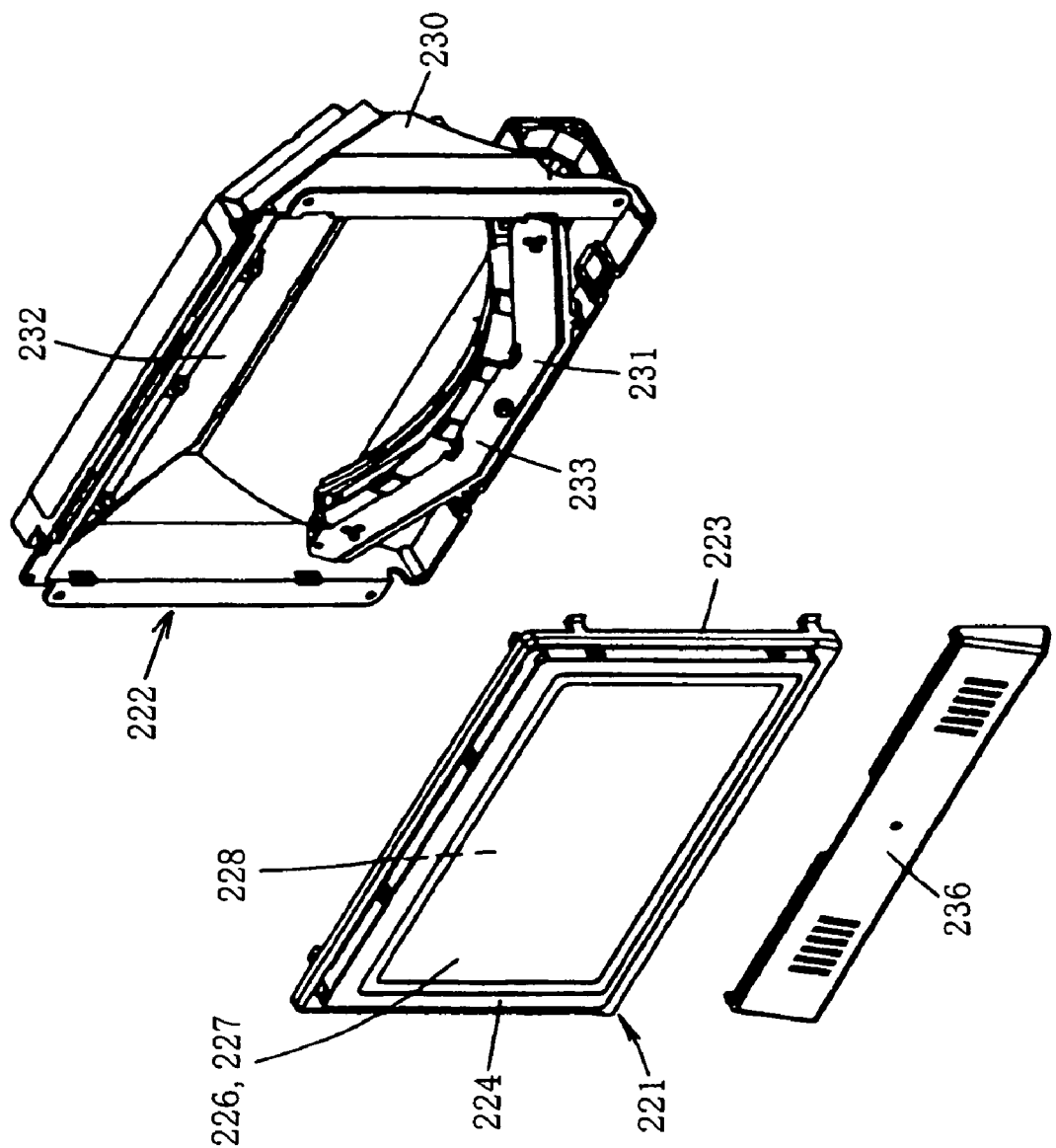
FIG. 3 is a perspective view of an image display system according to the embodiment of the present invention.
Figure 4:
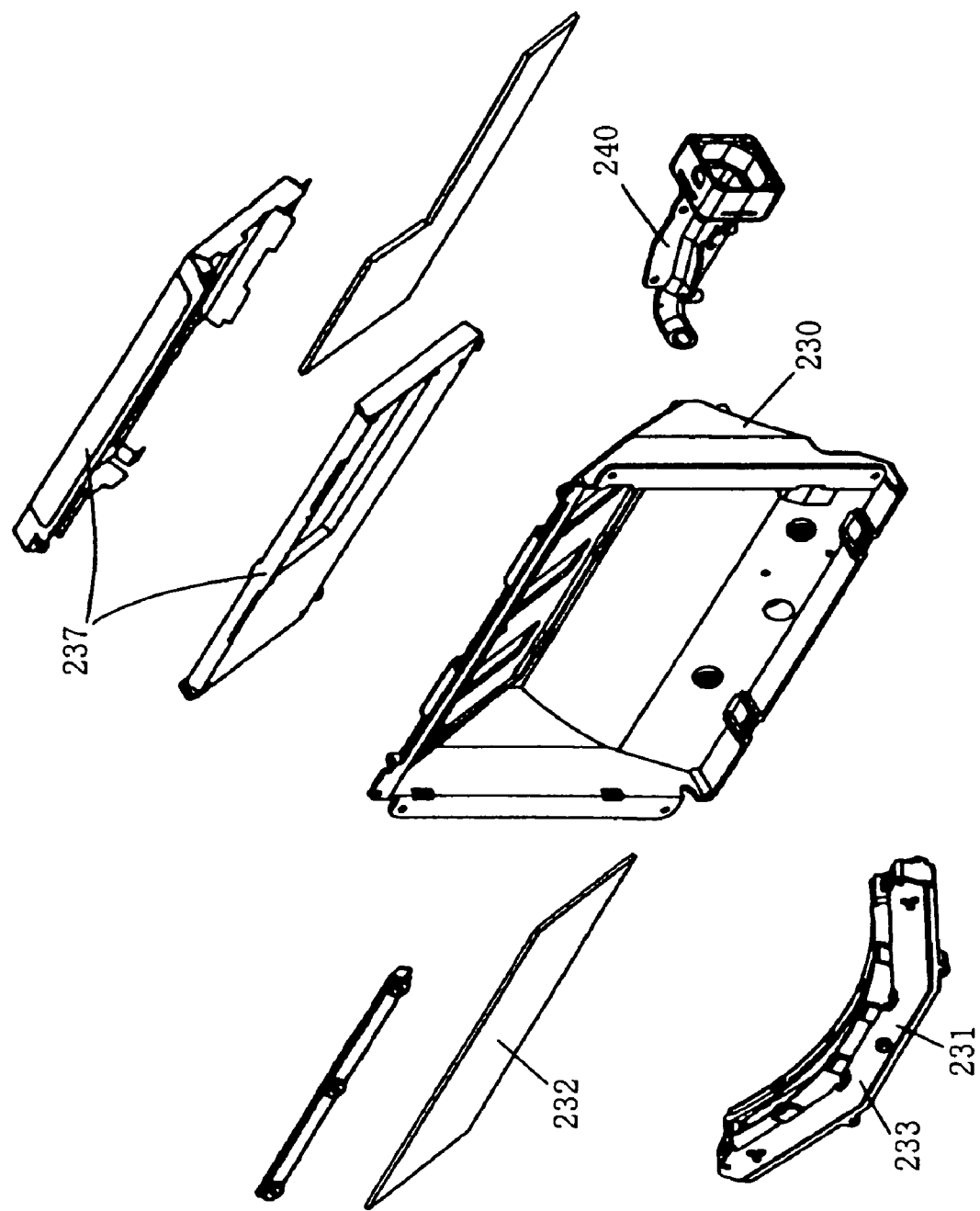
FIG. 4 is an exploded perspective view of a rear unit of the image display system.

FIG. 1 and FIG. 2 are a perspective view and an exploded perspective view of an image display box in which an image display system of an embodiment of the present invention is assembled to an exterior case, and FIG. 3 and FIG. 4 are a perspective view of the image display system according to an exemplary embodiment of the present invention and an exploded perspective view of the rear structure thereof.

The exterior case of an image display box 200 includes a front cover panel 201 and a rear cover box 202.

An image display system 220 includes a front unit 221 (front structure), a rear unit 222 (rear structure), and so on.

The front unit 221 includes a diffuser (diffuser panel) 226, a liquid crystal display panel unit 227, a Fresnel lens 228 are mounted to a mounting base 223 via a cover frame 224 and a lens holding frame 225, as will be described later.

The rear unit 222 includes a light source (a light source unit) 231, and a mirror (reflecting member) 232 assembled to a rear case 230 which defines an upper space on the rear side of the Fresnel lens 228 of the front unit 221 and a lower space below the upper space.

Figure 5:
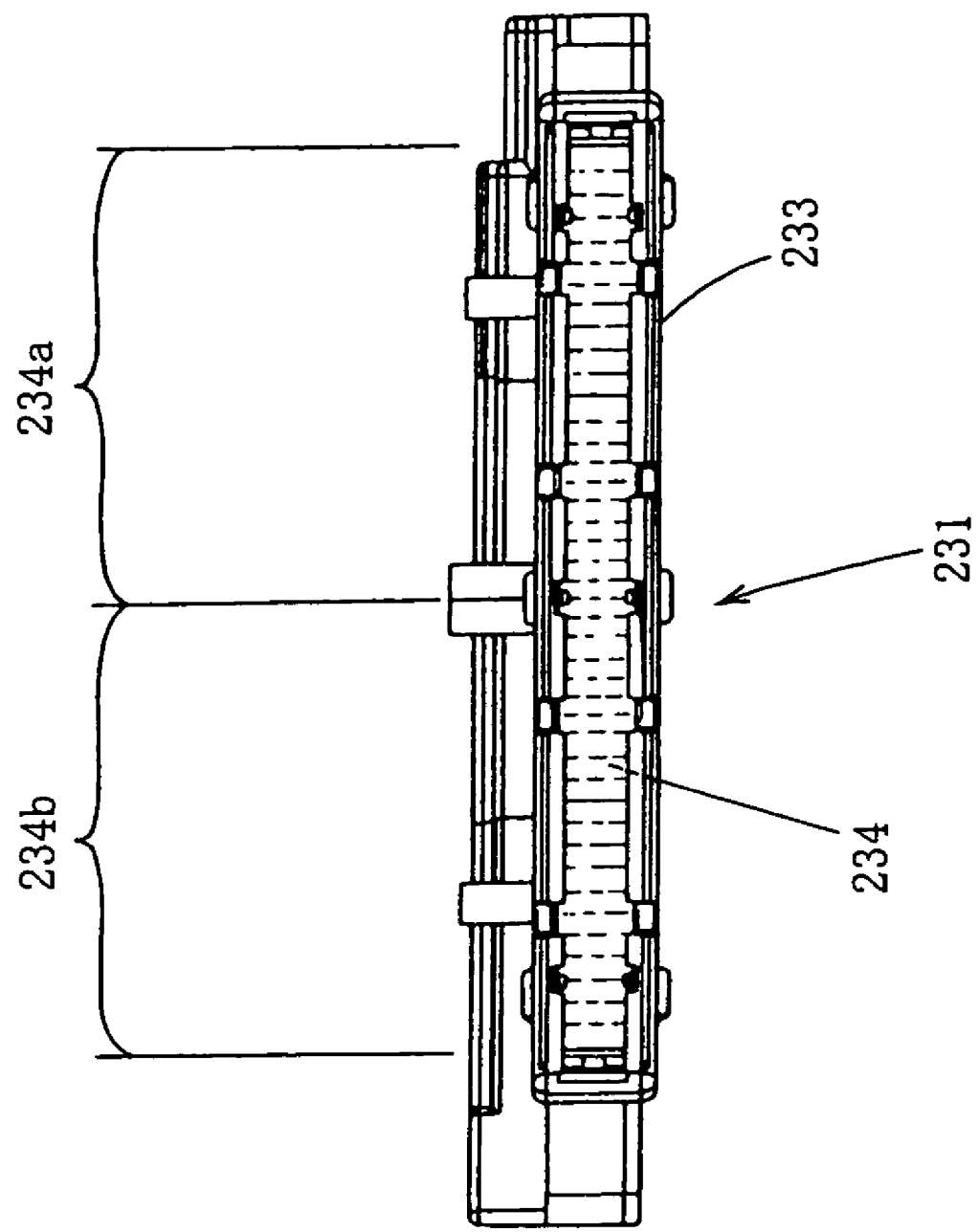
FIG. 5 is a front view of a light source.

The light source 231 includes a predetermined plural number of light sources 234 consecutively arranged on a center portion of a holder 233 and on peripheral portions formed on both sides thereof so as to incline toward the front of the holder by a predetermined angle as shown in FIG. 5 so as to makeup a linear light-emitting source, and is mounted to the rear wall of the lower space of the rear case 230 so as to incline toward the rear to allow light to be emitted, so that the peripheral portions of the holder 233 come on the left and right sides, and the light is emitted rearward and obliquely upward (rearward and obliquely inward from the light sources on the peripheral portions) with respect to the liquid crystal display panel unit 227.

The mirror 232 is mounted to the upper half wall which is inclined toward the front by a predetermined angle located in the upper space in the rear case 230 so that lights from the respective light sources 234 of the light source 231 is irradiated to (reflected to) the Fresnel lens 228.

The position of the light source 231 is determined so that the respective light sources 234 are arranged in the holder 233 with the centers of the optical axes passed substantially through the center portion of the Fresnel lens 228, and so as to be positioned at substantially uniform distance from the center portion of the Fresnel lens 228 and also to be positioned at a distance substantially the same as the focal distance from the center portion of the Fresnel lens 228 (the lights from the light sources 234 and the distance from the center portion of the Fresnel lens 228 pass through the mirror 232).

In this case, the plurality of light sources 234 of the light source 231 are arranged between the center portion and the peripheral portions of the holder 233 in the shape of a polygonal line. However, it is also possible to form the holder 233 into an arcuate shape, or form a light source storage of the holder 233 into an arcuate shape so as to arrange the plurality of the light sources 234 into the continuous arcuate shape.

On the front surface of the light source 231, a polarizing filter 235 (FIG. 13) for converting the light from a right light source 234a into a light having a polarization for the left eye, and the light from a left light source 234b into a light having a polarization for the right eye.

The front unit 221 is assembled to the upper side of the front opening surface of the rear case 230 of the rear unit 222, and a light source cover 236 for the light source 231 in the lower space of the rear case 230 is mounted to the lower side of the front unit 221 and below the front opening surface of the rear case 230. An air-cooling fan provided for cooling the light source 231 is provided on the back surface of the image display system 220.

When the image display system 220 configured as described above is stored in the image display box 200, the front cover panel 201 is mounted to the front surface of the image display system 220, a substrate for driving substrate holders 237, 238 is disposed on the rear portion, and the rear cover box 202 is mounted thereto.

Since the light source (light source unit) 231 is disposed in the lower space of the rear case 230 of the rear unit 222, the light source 231 can be disposed substantially at the same distance as the focal distance of the Fresnel lens 228 with respect to the Fresnel lens 228 via the mirror 232 (as will be described later, since the light from the light source 231 is refracted into the light for the left eye zone and the light for the right eye zone via the Fresnel lens 228), the size of the system can be reduced to a compact size. Also, since the light source 231 is mounted to the rear wall of the lower space so as to incline toward the rear, only small space is required.

When it is required to reduce the height because of the application or installation of the system or structure of the image display box 200, the depth of the center portion of the rear case 230 may be increased to dispose the light source 231 at the rearmost position.

Figure 6:
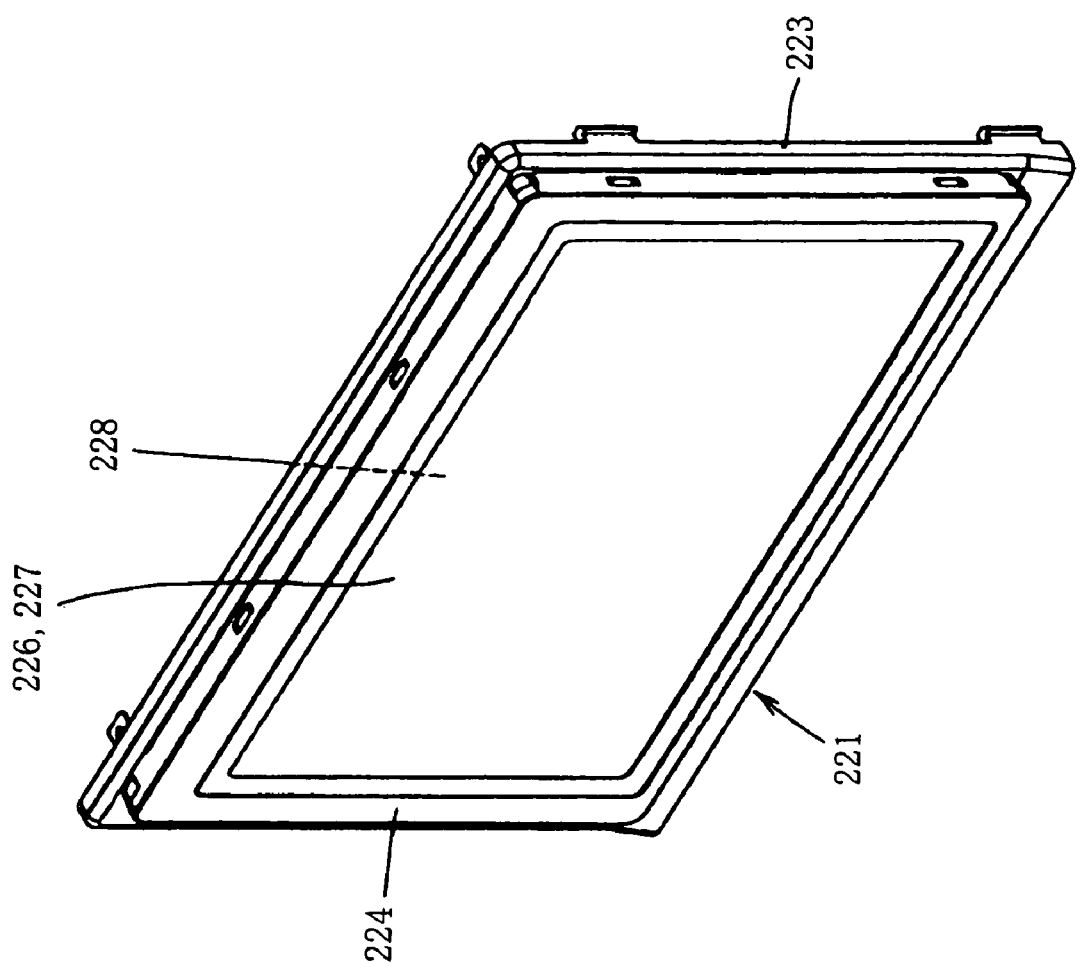
FIG. 6 is a perspective view of a front unit of the image display system.
Figure 7:
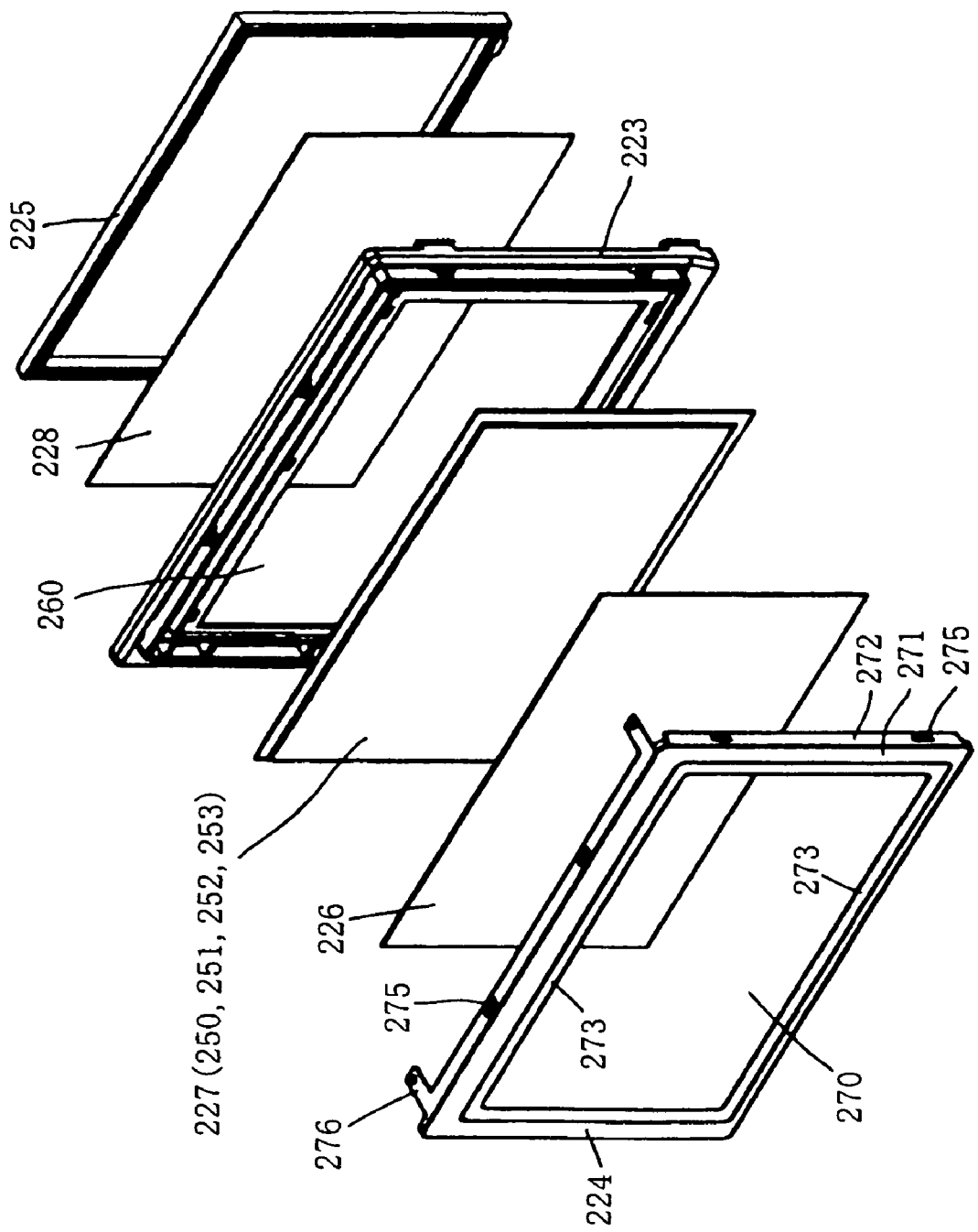
FIG. 7 is an exploded perspective view of the front unit of the image display system.
Figure 8:
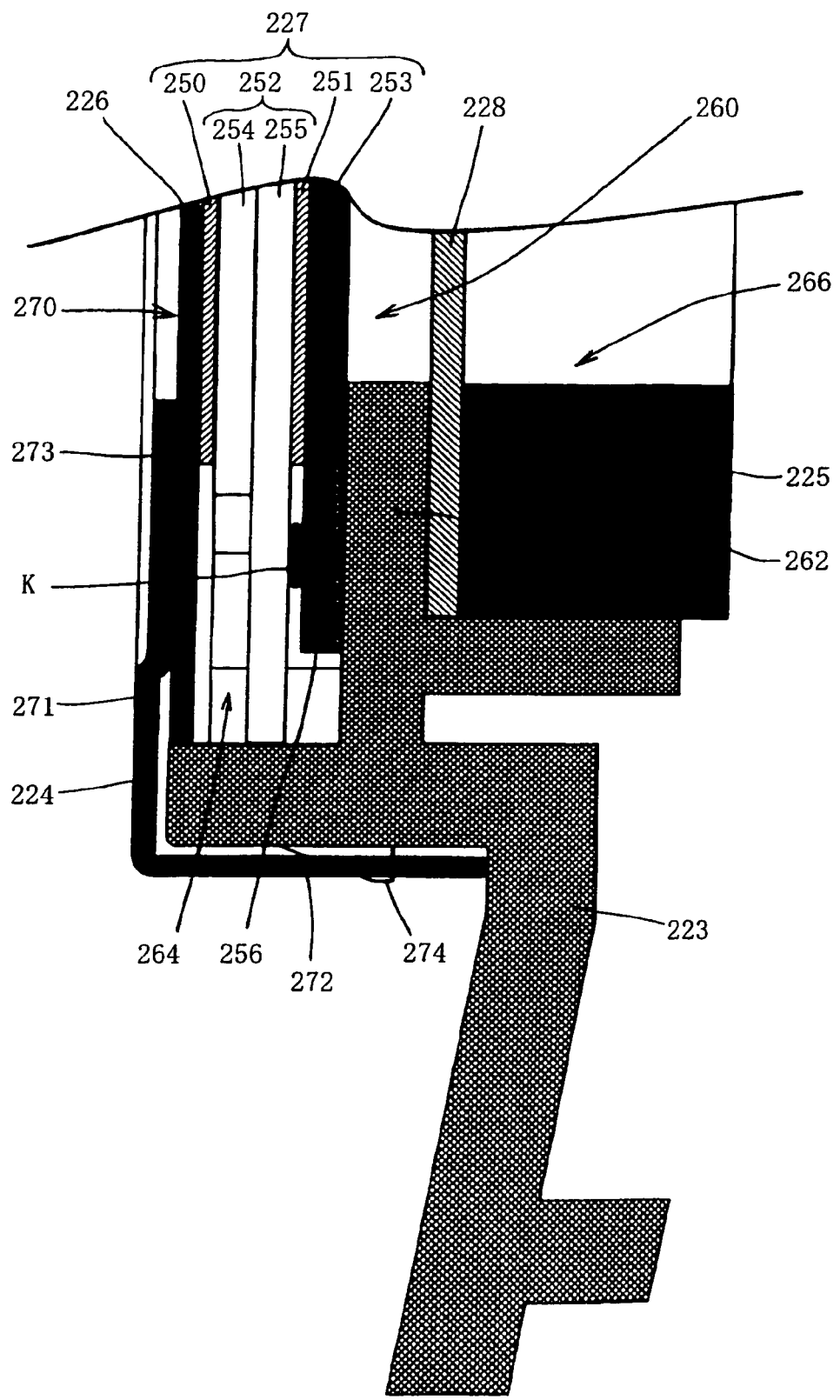
FIG. 8 is a cross-sectional view of the front unit of the image display system.
Figure 9:
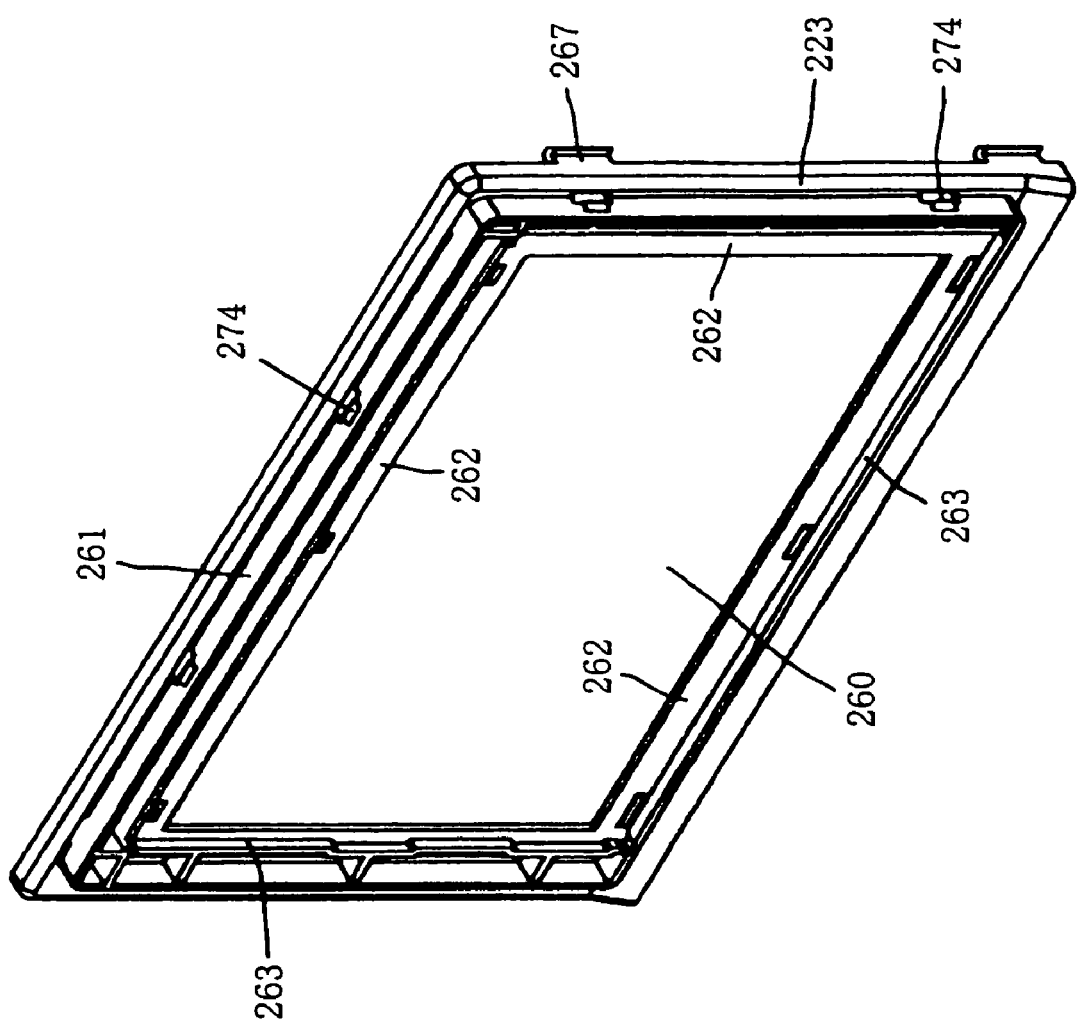
FIG. 9 is a perspective view of a mounting base.
Figure 10:
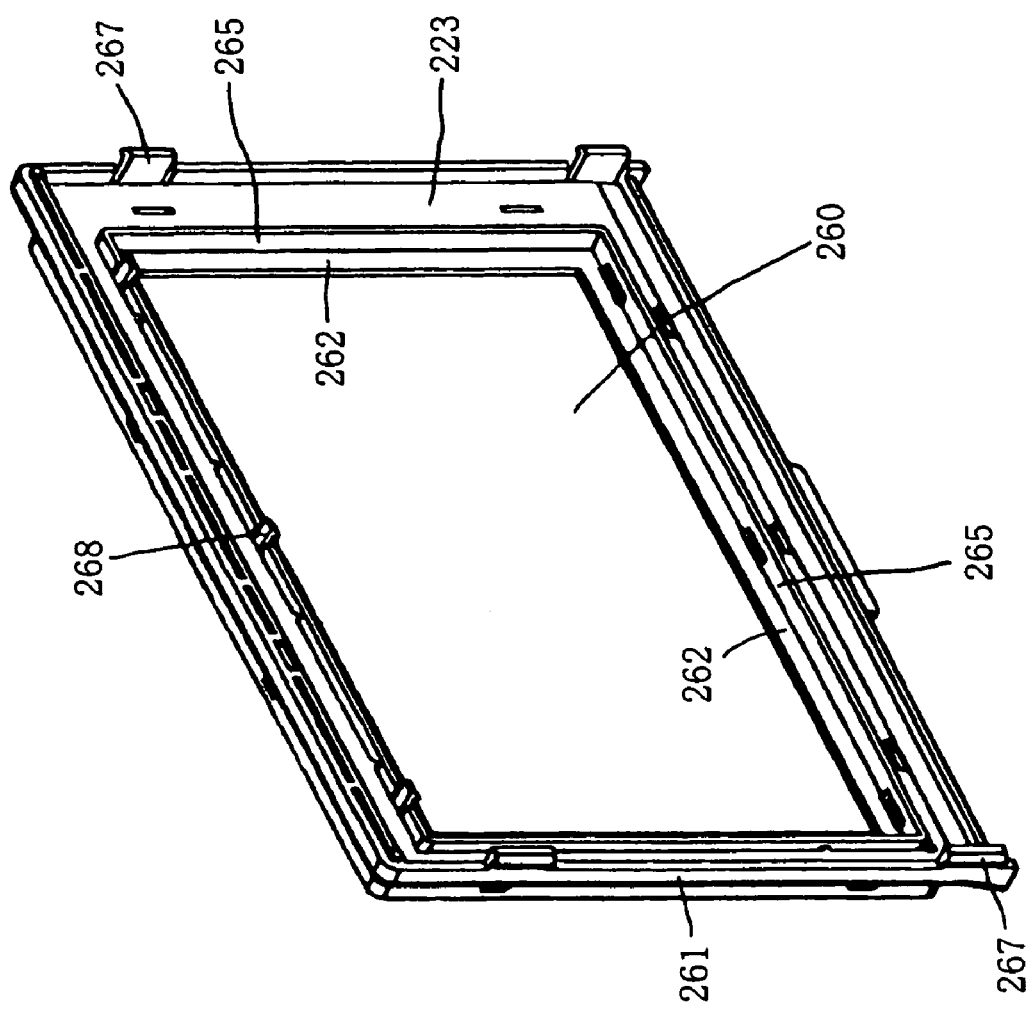
FIG. 10 is a perspective view of a back surface side of the mounting base.
Figure 11:
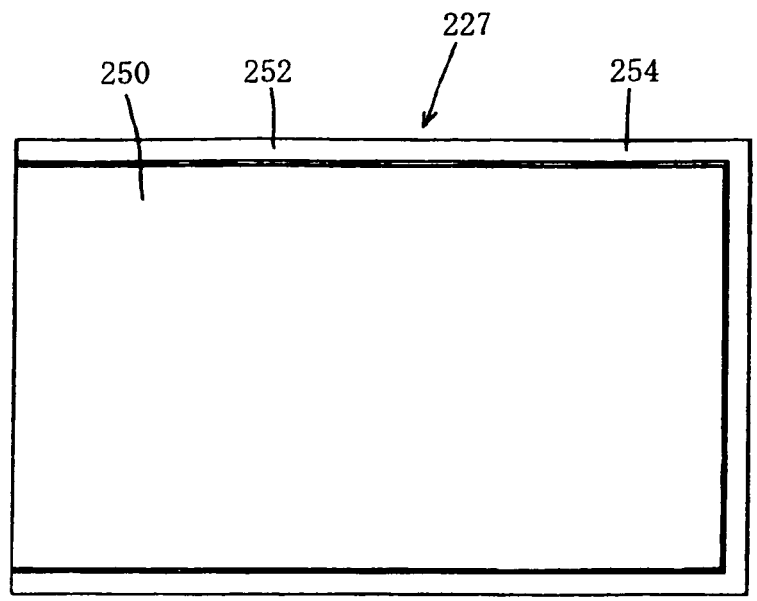
FIG. 11 is a surface view of a liquid crystal display panel unit.
Figure 12:
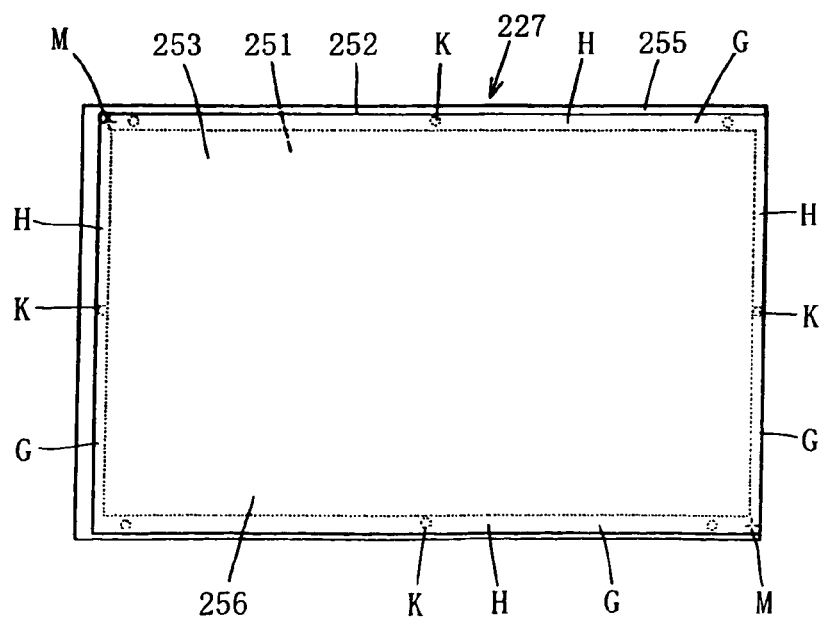
FIG. 12 is a back surface view of the liquid crystal display panel unit.

FIG. 6 to FIG. 8 are a perspective view, an exploded perspective view, and a partial cross-sectional view, respectively, of the front unit 221 of the image display system 220; FIG. 9 and FIG. 10 are a perspective view and a back-side perspective view, respectively, of the mounting base 223; FIG. 11 and FIG. 12 are a front surface view and a back surface view of the liquid crystal display panel unit 227.

The liquid crystal display panel unit 227 includes first and second polarizing plates 250, 251, a liquid crystal display panel 252, and a micro-patterned retarder 253.

The liquid crystal display panel 252 is provided with liquid crystal or the like (not shown) oriented so as to be twisted at a predetermined angle (for example, 90 degrees) between two glass base members 254, 255 of a predetermined size and constitutes, for example, a TFT liquid crystal display panel.

In this case, the front glass base member 254 of the liquid crystal display panel 252 is formed to be slightly smaller than the rear glass base member 255 thereof so that it can be formed on the basis of the rear glass base member 255.

The first and second polarizing plates 250, 251 are adapted to transmit only the lights having predetermined polarizations, respectively, and the first polarizing plate 250 is bonded to the front surface of the liquid crystal display panel 252 and the second polarizing plate 251 is bonded to the rear surface of the liquid crystal display panel 252 so that the polarizing axes are oriented orthogonally to each other.

The first and second polarizing plates 250, 251 are formed into almost the same size, and at least the second polarizing plate 251 is formed into a size to leave a predetermined margin G at the upper edge and the lower edge of the rear glass base member 255 of the liquid crystal display panel 252 as shown in FIG. 12. In other words, a contact area between the micro-patterned retarder 253 and the polarizing plate 251 disposed on the back surface of the liquid crystal display panel 252 is established and the end positions with the intermediary of the contact area, that is, the margin G forms non-contact areas in which the micro-patterned retarder 253 opposes the liquid crystal display panel 252 without coming into contact with the polarizing plate 251. Therefore, the polarizing plate 251 is entirely in contact with the micro-patterned retarder 253, so that unevenness of the view due to the mixed existence of the contact areas and the non-contact areas is prevented. It is also possible to provide a minute distance (for example 100 μl) between the polarizing plate 251 and the micro-patterned retarder 253 to achieve entirely non-contact state. In this case, a non-contact area having larger distance therefrom is formed on the outer peripheral portion of the polarizing plate 251.

Figure 13:
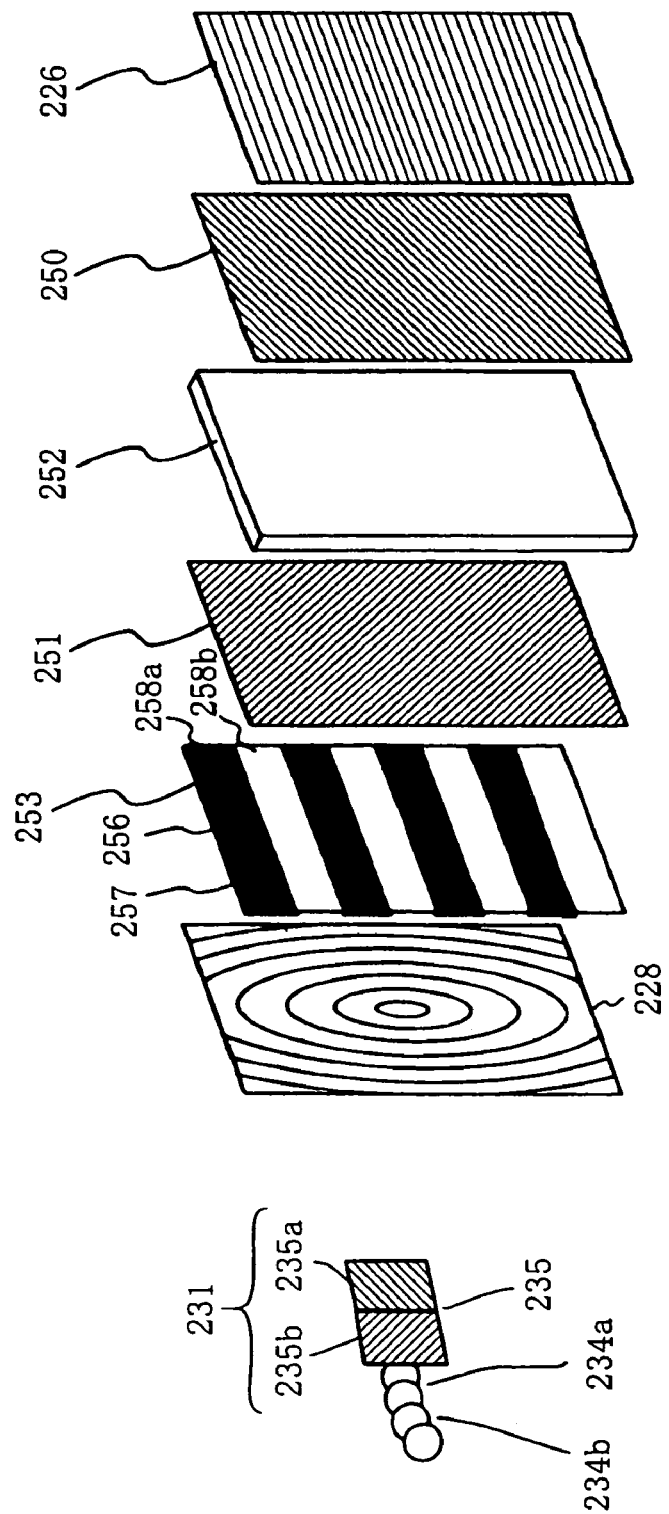
FIG. 13 is an explanatory drawing of the image display of the image display system.

The micro-patterned retarder 253 is formed with areas 258a each provided with a half wave retarder 257 of a minute width, and areas 258b each having the same width as the width of the half wave retarder 257 and not including the half wave retarder 257 repeatedly on a substrate (for example, a glass substrate) 256 having a light transmitting property as shown in FIG. 13. The areas 258a, 258b are provided alternately at substantially the same pitch as the unit of display of the liquid crystal display panel 252 by each unit of display (that is, by each horizontal line of the unit of display).

The micro-patterned retarder 253 is formed into almost the same size as the liquid crystal display panel 252 (the rear glass base member 255 of the liquid crystal display panel 252), and is bonded to the peripheral portion of the second polarizing plate 251 on the back surface of the liquid crystal display panel 252 so that the areas 258a, 258b are aligned with the display line of the liquid crystal display panel 252 through the back surface (flat side of the areas 258a, 258b without roughness) of a base member 256 via adhesive agent.

In other words, the micro-patterned retarder 253 is bonded in such a manner that the areas 258a, 258b are aligned with the display line of the liquid crystal display panel 252 through the back surface of the base member 256 and a predetermined peripheral portion H on the back surface of the base material 256 is bonded to the predetermined portion of the margin G formed at the upper edge or the lower edge of the rear glass base member 255 of the liquid crystal display panel 252 via an adhesive agent K as shown in FIG. 12.

In this case, in order to align the micro-patterned retarder 253 with the liquid crystal display panel 252, some cross marks M, for example, are formed as mating marks on the margin G of the glass base member 255 of the liquid crystal display panel 252 and the predetermined peripheral portion H of the base member 256 of the micro-patterned retarder 253, and application positions of the adhesive agent K are set to positions predetermined with respect to the cross marks, and the adhesive agent K is applied thereto. In this example, the cross marks M as reference points are set to two positions on the upper side and the lower side thereof, and the adhesive agent K is applied to three positions each on the upper portion and the lower portion and one position each on the left and right portions with reference to the marks M. It is also possible to reduce the position and the number of the adhesive agent K if sufficient adhering strength is ensured. The cross marks M may also be provided at the application positions of the adhesive agent K so that the adhesive agent K is applied thereto correspondingly.

The diffuser 226 functions as diffusing means for diffusing a light transmitted through the liquid crystal display panel 252 in the vertical direction, and is formed into substantially the same size as the liquid crystal display panel 252 (rear glass base member 255 of the liquid crystal display panel 252).

The Fresnel lens 228 is a plate shaped convex lens having a lens surface provided with concentrically arranged concaves and convexes on one side, and is formed almost into the same size as the liquid crystal display panel 252.

The mounting base 223 has a rectangular opening section 260 of a predetermined size, and is provided with an upright wall 262 of a predetermined height which defines the opening section 260 along the inner periphery of a frame 261. Formed on the front surface side of the upright wall 262 is a storage 264 for the liquid crystal display panel unit 227 and the diffuser 226 surrounded by a front inner peripheral wall 263, and formed on the back surface side of the upright wall 262 is a mounting portion 266 of the Fresnel lens 228 surrounded by a rear inner peripheral wall 265.

The opening section 260 is formed into a size smaller than the first and second polarizing plates 250, 251 adhered to both surfaces of the liquid crystal display panel 252, and almost the same as the display area of the liquid crystal display panel 252.

In this case, the height of the upright wall 262 of the lower side of the frame 261 is set to be higher than the lower ends of the first and second polarizing plates 250, 251 on both surfaces of the liquid crystal display panel 252 in a state in which the liquid crystal display panel unit 227 is stored in the storage 264 as shown in FIG. 8 (in a state in which the liquid crystal display panel unit 227 is placed on the bottom surface of the storage 264). The height of the upright wall 262 on the upper side of the frame 261 is set to be lower than the upper ends of the first and second polarizing plates 250, 251 on both surfaces of the liquid crystal display panel 252 also in a state in which the liquid crystal display panel unit 227 is stored in the storage 264. The height of the left and right upright walls 262 of the frame 261 are set to be the same height as the upper upright wall 262.

Provided on the peripheral portion of the back surface of the frame 261 so as to project at four positions are fitting claws 267 for assembling to the rear case 230 of the rear unit 222.

Provided on the peripheral portion of the rear inner peripheral wall 265 of the frame 261 so as to project there at three positions are fitting craws 268 for engaging the lens holding frame 225.

The cover frame 224 is formed with an opening 270 corresponding to the opening section 260 of the mounting base 223 and a front wall section 271 corresponding to the upright wall 262, and a peripheral frame wall portion 272 is formed so as to fit the front outer periphery of the frame 261 of the mounting base 223.

The opening 270 is formed into substantially the same size as the opening section 260 of the mounting base 223, is formed so as to be positioned in front of the opening section 260 of the mounting base 223 in a state in which the front wall portion 271 which surrounds the opening 270 opposes the upright wall 262 which surrounds the opening section 260 in front in a state in which the cover frame 224 is fitted to the mounting base 223 and the peripheral frame wall portion 272 is fitted and mounted to the front outer periphery of the frame 261 of the mounting base 223 as shown in FIG. 8.

The front wall portion 271 is formed with an abutting portion 273 which abuts against the diffuser 226 on the front surface of the liquid crystal display panel 252, and the abutting portion 273 is formed along the entire circumference of the front wall portion 271 at a position opposing to the upright wall 262 so that the peripheral edge portion of the opening 270 is warped toward the upright wall 262 to generate a resilient supporting force.

The peripheral frame wall portion 272 is provided with engaging holes 275 to be engaged with engaging projections 274 for mounting the same formed on the front outer periphery of the frame 261 of the mounting base 223 at eight positions around the circumference thereof. On the upper portion of the peripheral frame wall portion 272, there are formed mounting strips 276 each having a hole for a fixing screw.

In other words, assembly is achieved by storing the liquid crystal display panel unit 227 including the first polarizing plate 250 on the front surface of the liquid crystal display panel 252 and the second polarizing plate 251 and the micro-patterned retarder 253 on the back surface thereof as well as the diffuser 226 to be disposed on the front surface thereof in the storage 264 on the front surface side of the mounting base 223, fitting the peripheral frame wall portion 272 of the cover frame 224 to the front outer periphery of the frame 261 of the mounting base 223, and engaging the engaging projections 274 on the front outer periphery thereof with the engaging holes 275 on the peripheral frame wall portion 272.

In this state, as shown in FIG. 8, the abutting portion 273 on the front wall portion 271 of the cover frame 224 abuts against the diffuser 226, and the diffuser 226 and the liquid crystal display panel unit 227 are supported in the depressed state by the upright wall 262 of the mounting base 223 opposing to the abutting portion 273 of the cover frame 224. The opening section 260 surrounded by the upright wall 262 of the mounting base 223 and the opening 270 of the cover frame 224 are smaller than the first and second polarizing plates 250, 251 on both sides of the liquid crystal display panel 252. In other words, the end portions of the first and second polarizing plates 250, 251 are interposed between the upright wall 262 of the mounting base 223 and the abutting portion 273 of the cover frame 224, and the diffuser 226 and the liquid crystal display panel unit 227 including the first and second polarizing plates 250, 251 and the micro-patterned retarder 253 on both surfaces of the liquid crystal display panel 252 are supported in the depressed state in the fore-and-aft direction by the upright wall 262 of the mounting base 223 and the abutting portion 273 of the cover frame 224 at a predetermined resilient force. In other words, since the first polarizing plate 250, the liquid crystal display panel 252, the second polarizing plate 251, and the micro-patterned retarder 253, including the portion overlapped without a gap are supported in the depressed state between the upright wall 262 and the abutting portion 273, the overlapped portion to be pressed assumes a uniform thickness at any portions, and hence an even pressing force is applied thereto. Therefore, the supported state is established easier than the case in which an uneven force is applied. In other words, since the micro-patterned retarder 253 is also supported sufficiently, the adhered state can be maintained only by using the adhesive agent at predetermined portions in the margin G of the end area (it is not necessary to adhere strongly by the front surface adhesion). Also, when only the portion where the thickness may not always be uniform (such as an adhering area) is supported in the depressed state, an uneven force may be applied. However, since it is pressed by a constant force, it can be prevented from becoming damaged.

Therefore, the liquid crystal display panel unit 227 having the two polarizing plates 250, 251 and the micro-patterned retarder 253 disposed therein can be stored and supported adequately, and hence the displacement or damage of the micro-patterned retarder 253 or the like due to the supporting state can be prevented.

The Fresnel lens 228 can be assembled by being stored in the mounting portion 266 on the back surface side of the mounting base 223, fitting the lens holding frame 225, and engaging the fitting claws 268 for engagement.

FIG. 13 is an explanatory drawing illustrating image display of the image display system 220.

In front of the left and right light sources 234*a*, 234*b* of the light source 231, there is attached the polarizing filter 235. The polarizing filter 235 includes the front area of the right light source 234*a* (right area) 235*a* and the front area of the left light source 234*b* (left area) 235*b* which are adapted to provide different polarizations to transmitting light (for example, to differentiate polarization axes (directions) of transmitting light between the right area 235*a* and the left area 235*b* by 90 degrees).

Only part of the light emitted from the left and right light sources 234*a*, 234*b* having predetermined polarizations can be transmitted through the polarizing filter 235. In other words, a light passed through the right area 235*a* of the polarizing filter 235 (light from the right light source 234*a*) and a light passed through the left area 235*b* thereof (light from the left light source 234*b*) out of the light emitted from the left and right light sources 234*a*, 234*b* are irradiated on the Fresnel lens 228 as lights having different polarizations. As will be described later, the light passed through the right area 235*a* of the polarizing filter 235 reaches the left eye of the viewer, and the light passed through the left area 235*b* reaches the right eye of the viewer.

The Fresnel lens 228 is a convex lens, and refracts an optical path of the light emitted from the left and right light sources 234*a*, 234*b* in a diffusing manner into substantially parallel lights, then allows the same to pass through the micro-patterned retarder 253 and then to be irradiated onto the liquid crystal display panel 252.

At this time, a light irradiated from the micro-patterned retarder 253 is emitted so as not to diffuse in the vertical direction, and is irradiated on the liquid crystal display panel 252. In other words, the light transmitted through a specific area of the micro-patterned retarder 253 is transmitted through a portion of the liquid crystal display panel 252 having a specific unit of display.

Regarding the lights irradiated to the liquid crystal display panel 252, the light passed through the right area 235*a* of the polarizing filter 235 and the light passed through the left area 235*b* thereof are incident onto the Fresnel lens 228 at different angles, are refracted in the Fresnel lens 228, and are emitted from the liquid crystal display panel 252 along different routes on the right side and the left side.

The incident light which is incident upon the liquid crystal display panel 252 is emitted at a polarization axes (directions) shifted by 90 degrees in a state in which no voltage is applied to the liquid crystal. On the other hand, when a voltage is applied to the liquid crystal, twisting of the liquid crystal is released, and the incident light is emitted at the unchanged polarization.

The micro-patterned retarder 253 and the polarizing plate 251 (second polarizing plate) are disposed on the side of the light source 231 of the liquid crystal display panel 252, and the polarizing plates 250 (first polarizing plate is disposed on the viewer side.

The micro-patterned retarder 253 includes the areas 258*a* which change the phase of light ray transmitting therethrough by the half wave retarders 257 provided and the areas 258*b* which do not change the phase of light ray transmitting therethrough since the half wave retarders 257 are not provided are arranged repeatedly at minute intervals.

The half wave retarder 257 is disposed so that the optical axis thereof is inclined by 45 degrees with respect to a polarization axis of the light transmitting through the right area 235*a* of the polarizing filter 235, thereby emitting the light transmitted through the right area 235*a* with its polarization axis rotated by 90 degrees. In other words, polarization of the light transmitted through the right area 235*a* is rotated by 90 degrees to equalize to that of the light transmitting through the left area 235*b*. In other words, the areas 258*b* where the half wave retarders 257 are not provided allow lights passed through the left area 235*b* and having the same polarization as the polarizing plate 251 to be transmitted therethrough. The areas 258*a* where the half wave retarders 257 are provided cause the light passed through the right area 235*a* and having the polarization axis orthogonal to the polarizing plate 251 to be rotated so as to equalize the polarization axis thereof to that of the polarizing plate 251 before emission.

Repetition of the polarization characteristics of the micro-patterned retarder 253 is adapted to have substantially the same pitch as the unit of display of the liquid crystal display panel 252 to differentiate polarization of the lights transmitted therethrough by each unit of display (that is, by each lateral horizontal line of the unit of display). Therefore, the polarization characteristics of the micro-patterned retarder are differentiated for each of corresponding horizontal lines (scanning line) as the unit of display of the liquid crystal display panel 252, whereby the directions of the lights emitted from the respective horizontal lines are different.

In this manner, since it is necessary to irradiate different lights onto the display devices of the liquid crystal display panel 252 (horizontal lines) for each repeated polarization characteristics of the micro-patterned retarder 253, the lights to be irradiated on the liquid crystal display panel 252 after having transmitted through the micro-patterned retarder 253 must be vertical diffusion controlled lights.

In other words, the areas 258a of the micro-patterned retarder 253 for changing the phase of the light equalize the light having transmitted through the right area 235a of the polarizing filter 235 to the polarization of the light transmitted through the left area 235b upon transmission. On the other hand, the areas 258b of the micro-patterned retarder 253 which do not change the phase of the light allow the light having transmitted through the left area 235b of the polarizing filter 235 to be transmitted as is. Then, the lights emitted from the micro-patterned retarder 253, having the same polarizations as the light transmitted through the left area 235b, are incident upon the polarizing plate 251 provided on the light source side of the liquid crystal display panel 252.

The polarizing plate 251 functions as the second polarizing plate, and has such polarization characteristics as to allow the light having the same polarization as the light having transmitted through the micro-patterned retarder 253 to be transmitted. In other words, the light having transmitted through the left area 235b of the polarizing filter 235 is transmitted through the second polarizing filter 251, and the polarizing axis of the light having transmitted through the right area 235a of the polarizing filter 235 is rotated by 90 degrees before being transmitted through the second polarizing plate 251. The polarizing plate 250 functions as the first polarizing plate, and has such polarizing characteristics as to allow light having a polarization different from the polarizing plate 251 by 90 degrees to be transmitted therethrough.

The micro-patterned retarder 253, the polarizing plate 251, the liquid crystal display panel 252, and the polarizing plate 250 are combined to constitute the image display system. At this time, in a state in which a voltage is applied to the liquid crystal, the light having transmitted through the micro-patterned retarder 253 is transmitted through the polarizing plate 250. On the other hand, in a state in which no voltage is applied to the liquid crystal, the light having transmitted through the micro-patterned retarder 253, whereof the polarization axes (directions) are twisted by 90 degrees, is emitted from the liquid crystal display panel 252, and hence is not transmitted through the polarizing plate 250.

The diffuser 226 is mounted to the front surface side (viewer side) of the first polarizing plate 250, and diffuses the light having transmitted through the liquid crystal display panel in the vertical direction.

Figure 14:
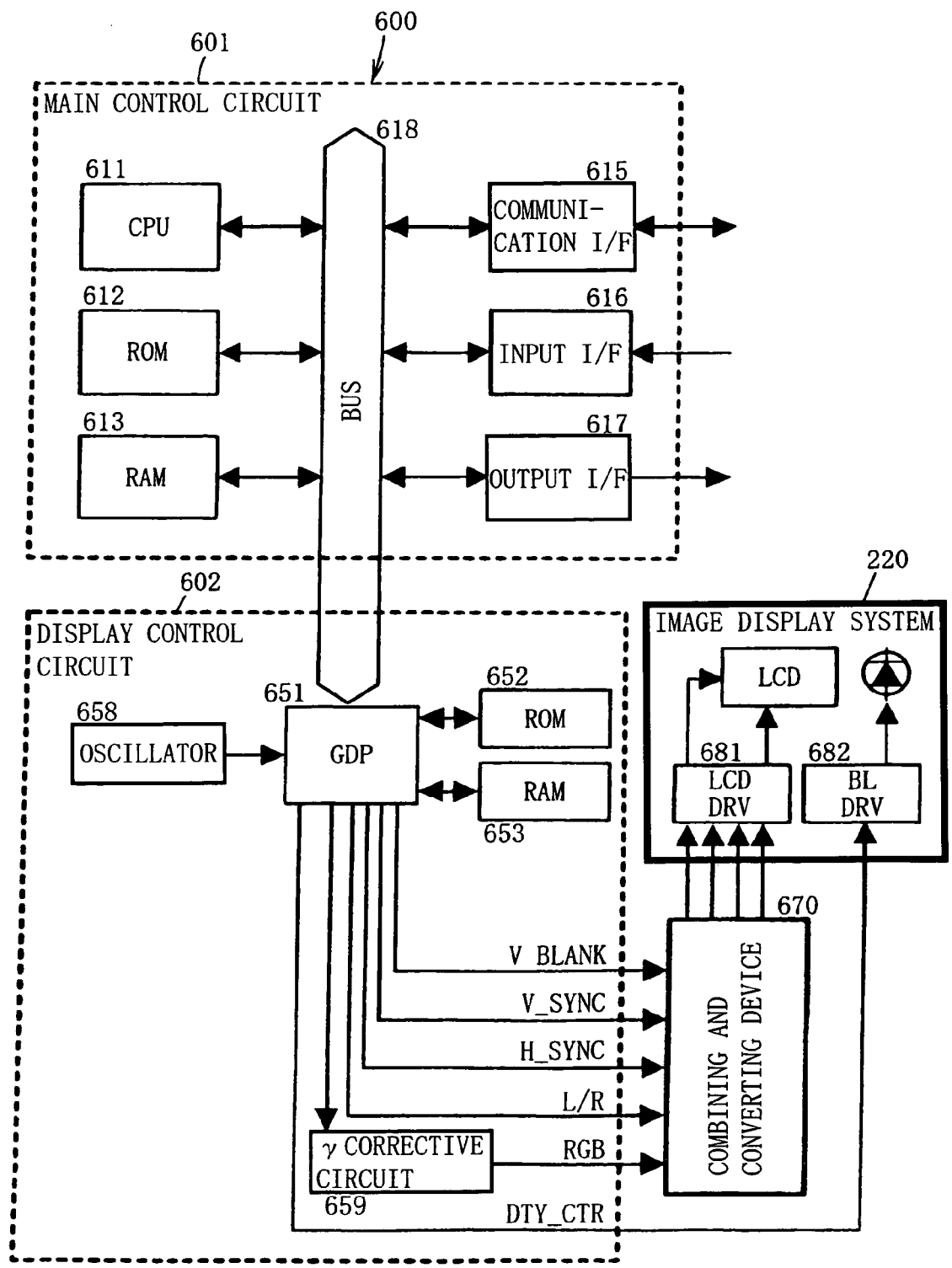
FIG. 14 is a block diagram of a drive circuit of the image display system.

FIG. 14 is a block diagram showing a drive circuit 600 of the image display system 220.

A main control circuit 601 for driving the image display system includes a CPU 611, a ROM 612 having a program or the like stored therein in advance, and a RAM 613 as a memory used as a work area when the CPU 611 is in operation. The CPU 611, the ROM 612, and the RAM 613 are connected by a bus 618. The bus 618 includes an address bus and a data bus which are used when the CPU 611 reads and writes data.

A communication interface 615, an input interface 616, and an output interface 617, which perform input and output with respect to the outside, are connected to the buss 618. The communication interface 615 is a data input/output section for data transmission according to a predetermined communication protocol. The input interface 616 and the output interface 617 input/output image data to be displayed on the image display system.

A graphic display processor (GDP) 651 of a display control circuit 602 is connected to the bus 618. The GDP 651 calculates image data generated by the CPU 611, writes the same to a frame buffer provided in a RAM 653, and generates signals (RGB, V BLANK, V_SYNC, H_SYNC) to be output to the image display system. A ROM 652 and the RAM 653 are connected to the GDP 651, and the RAM 653 is provided with a work area where the GDP 651 works and the frame buffer for storing the display data. The ROM 652 includes a program and data required for the operation of the GDP 651.

The GDP 651 includes an oscillator 658 for supplying a clock signal to the GDP 651 connected thereto. The clock signal generated by the oscillator 658 defines the operating frequency of the GDP 651 and generates a frequency of the synchronized signal output from the GDP 651 (for example, V_SYNC, VBLAMNK).

A RGB signal output from the GDP 651 is input to a γ corrective circuit 659. The γ corrective circuit 659 corrects a non-linear characteristic of brightness with respect to the signal voltage of the image display system, adjusts the illumination brightness of the image display system, and generates the RGB signal output to the image display system.

A combining and converting device 670 is provided with a frame buffer for right-eye, a frame buffer for left-eye and a frame buffer for three-dimensional view, and writes a right-eye image sent from the GDP 651 in the frame buffer for right-eye, a left-eye image to the frame buffer for left-eye. Then, the combining and converting device combines the right-eye image and the left-eye image to generate an image for three-dimensional view, and writes the same in the frame buffer for three-dimensional view, and outputs the image date for three-dimensional view to the image display system as the RGB signal.

Generation of the image for three-dimensional view by combining the right-eye image and the left-eye image is done by combining the right-eye image and the left-eye image according to the intervals of the half wave retarders 257 of the micro-patterned retarder 253. More specifically, since the half wave retarders 257 of the micro-patterned retarder 253 of the image display system according to the present embodiment are disposed at intervals of the unit of display of the liquid crystal display panel 252, the image for three-dimensional view is displayed so that the right-eye images and the left-eye images are alternately displayed by each lateral line (scanning line) as the unit of display of the liquid crystal display panel 252.

The left-eye image data transmitted from the GDP 651 during output of a L signal is written in the frame buffer for left-eye and the right-eye image data transmitted from the GDP 651 during output of a R signal is written in the frame buffer for right-eye. Then, the left-eye image data written in the frame buffer for left-eye and the right-eye image data written in the frame buffer for right-eye are read out for each scanning line and written in the frame buffer for three-dimensional view.

The image display system includes a liquid crystal driver (LCD DRV) 681, and a backlight driver (BL DRV) 682. The liquid crystal driver (LCD DRV) 681 applies a voltage to the electrodes of the liquid crystal display panel in sequence based on the V BLANK signal, the V_SYNC signal, H_SYNC signal, and the RGB signal transmitted from the combining and converting device 670 to display a combined image for three-dimensional view on the liquid crystal display panel.

The backlight driver 682 changes duty ratios of voltage applied to the light sources (backlights) 234a, 234b based on the DTY_CTR signal output from the GDP 651, thereby changing brightness of the liquid crystal display panel 252.

Figure 15:
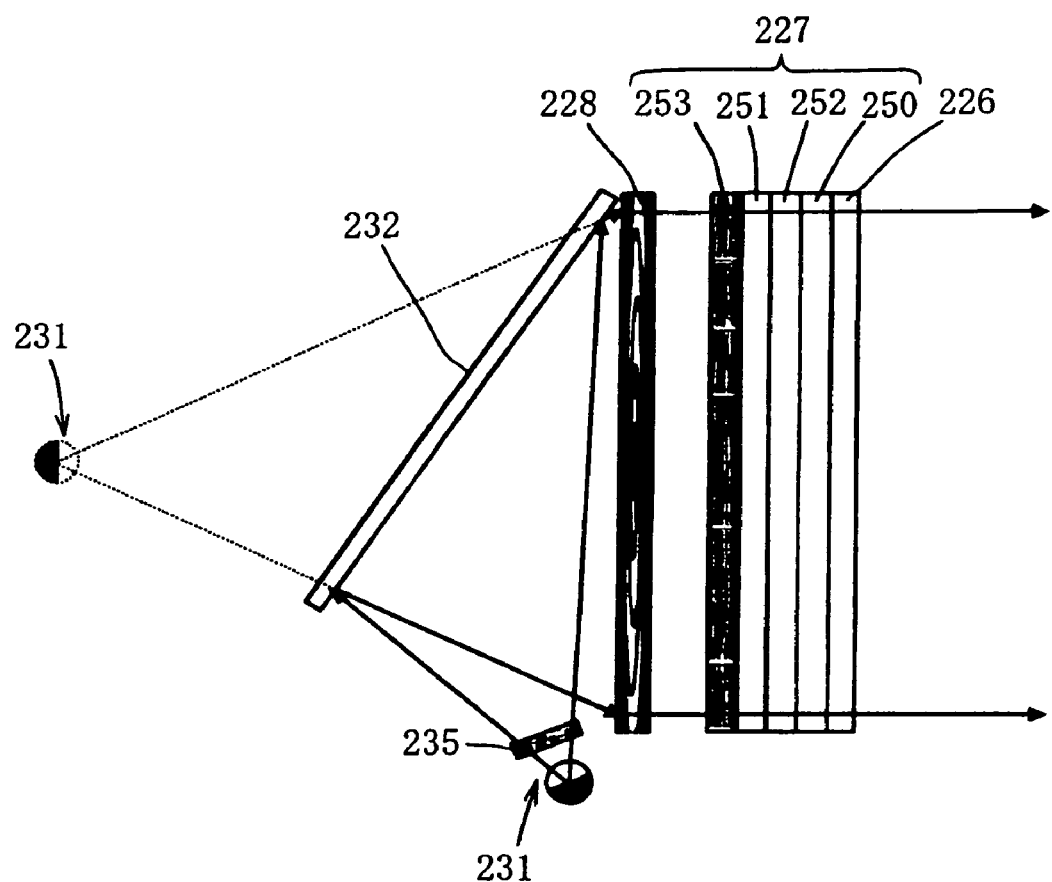
FIG. 15 is a side view of an optical system of the image display system.
Figure 16:
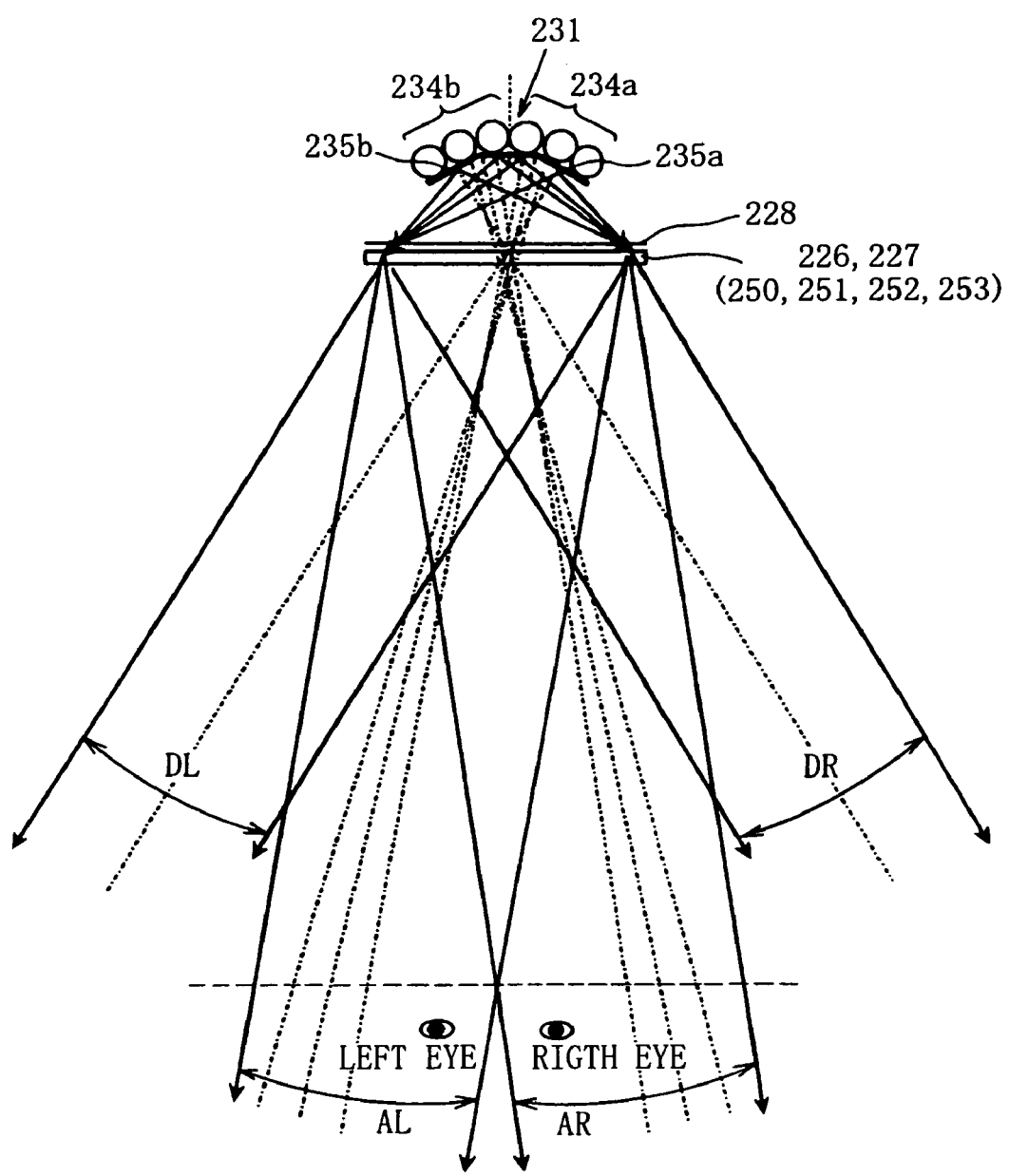
FIG. 16 is a plan view of the optical system of the image display device.

FIG. 15, FIG. 16 are a side view and a plan view showing an optical system of the image display system 220. In FIG. 15, only the center portion of the light source 231 is shown, and the light source 231 indicated by a dotted line is an apparent position. In FIG. 16, the mirror 232 is omitted, and the light source 234 (left and right light sources 234a, 234b) are schematically shown in an apparent position.

As shown in FIG. 15, lights emitted from the respective light sources 234a, 234b are passed through the polarizing filter 235 and is radially diffused.

The light emitted from the right light source 234a which have passed through the right area 235a of the polarizing filter 235 (a dashed line indicates a center of the optical path) reaches the Fresnel lens 228, where the directions of travel of the lights are changed, then are transmitted through the micro-patterned retarder 253 and the liquid crystal display panel 252, and then reach the left eye zone.

Since the right light sources 234a are arranged consecutively on the center portion (right side from the center) of the light source 231, brightness of the light reaching the left eye zone is high. In other words, the light from the light source 234a on the center side reaches an AL area, and the light from the light source 234a adjacent thereto is emitted to an area which significantly overlaps the AL area, and hence the lights from the sequentially adjacent light source 234a are emitted to the areas which sequentially overlap each other. Therefore, sufficient light is irradiated on the left eye zone.

Lights emitted from the left light source 234b which are transmitted through the left area 235b of the polarizing filter 235 (a broken line indicates a center of the optical path) reach the Fresnel lens 228 where the directions of travel of the lights are changed, are passed through the micro-patterned retarder 253 and the liquid crystal display panel 252, and then reach the right eye zone.

Since the left light source 234b is arranged consecutively on the center portion (left side from the center) of the light source 231, the brightness of the light reaching the right eye zone is high. In other words, the light from the light source 234b on the center side reaches the AR area, but the light from the adjacent light source 234b is emitted to an area which significantly overlaps the AR area, and hence the lights from the sequentially adjacent light source 234b are emitted to the areas which sequentially overlap each other. Therefore, the sufficient light is irradiated on the right eye zone.

The pitch of the scanning lines of the liquid crystal display panel 252 and the repeating pitch of the polarization characteristics on the micro-patterned retarder 253 are equalized, and the lights coming from the different directions are irradiated on each pitch of the scanning lines of the liquid crystal display panel 252 and hence the lights are emitted in the different directions.

Lights emitted from the right light source 234a and passed through the right area 235a of the polarizing filter 235 pass through the Fresnel lens 228, reach the micro-patterned retarder 253, pass through the areas 258a of the micro-patterned retarder 253, where the polarization axes (directions) are turned by 90 degrees before emission (light transmitted through the right area 235a is transmitted), and then pass through the liquid crystal display panel 252, and reach the left eye zone. In other words, left-eye images displayed by the display devices at positions corresponding to the areas 258a of the liquid crystal display panel 252 reach the left eye.

Since the areas 258b which are arranged alternately with the areas 258a of the micro-patterned retarder 253 do not change the polarization of light, the lights from the right area 235a of the polarizing filter 235 do not pass through the polarizing plate 251 of the liquid crystal display panel 252, that is, the display devices (which display the right-eye images) at positions corresponding to the areas 258b of the liquid crystal display panel 252.

The lights emitted from the left light source 234b and passed through the left area 235b of the polarizing filter 235 pass through the Fresnel lens 228, reach the micro-patterned retarder 253, pass through the areas 258b of the micro-patterned retarder 253 which allow the light of the same polarization as the left area 235b of the polarizing filter 235, pass through the liquid crystal display panel 252 and reach the right eye zone. In other words, the right-eye images displayed by the display devices at positions corresponding to the areas 258b of the liquid crystal display panel 252 reach the right eye.

Since the areas 258a arranged alternately with the areas 258b of the micro-patterned retarder 253 change the polarization of light, the lights from the left area 235b of the polarizing filter 235 do not pass through the display devices (which display the left-eye images) at positions corresponding to the polarizing plate 251 of the liquid crystal display panel 252, that is, the areas 258a of the liquid crystal display panel 252.

Although cross-talk caused by overlap of the right-eye image and the left-eye image due to birefringence or radio scattering on the Fresnel lens 228 or the liquid crystal display panel 252 may be generated, since the plurality of right light sources 234a and the left light sources 234b are arranged in the lateral direction, the cross-talk can be reduced.

As described above, since the plurality of right light sources 234a and the left light sources 234b are arranged respectively, the sufficient light is irradiated to the left eye zone and the right eye zone. In other words, the left-eye image having sufficient brightness reaches the left eye zone, while the right-eye image having sufficient brightness reaches the right eye zone. Therefore, even when the right-eye image enters the left eye, or the left-eye image enters the right eye due to the birefringence or radio scattering on the Fresnel lens 228 or the liquid crystal display panel 252, the difference in brightness from the left-eye image which reaches the left eye, or the difference in brightness from the right-eye image which reaches the right eye, relatively increases, and hence the cross-talk can be sufficiently eliminated.

Therefore, the viewer can easily recognize the three-dimensional image by the right-eye image and the left-eye image, and hence three-dimensional view can easily achieved by the three-dimensional perception based on the parallax of both eyes.

Lights from the plurality of right light sources 234a disposed around the right periphery of the light source 231 are emitted to the left side of the left eye zone at a wide angle (DL area), and lights from the plurality of left light sources 234b disposed on the left periphery of the light source 231 are emitted to the right side of the right eye zone at a wide angle (DR area).

Therefore, the viewing angle of the image display system increases. Therefore, when video game or the like is played with this image display system, or when this image display system is used as an image display system for displaying a game machine (such as a pinball machine), the image can be viewed not only by the player, but also many persons around the player.

Although the three-dimensional images cannot be viewed in the DL area and in the DR area, the images can be viewed as the two-dimensional images.

Figure 17:
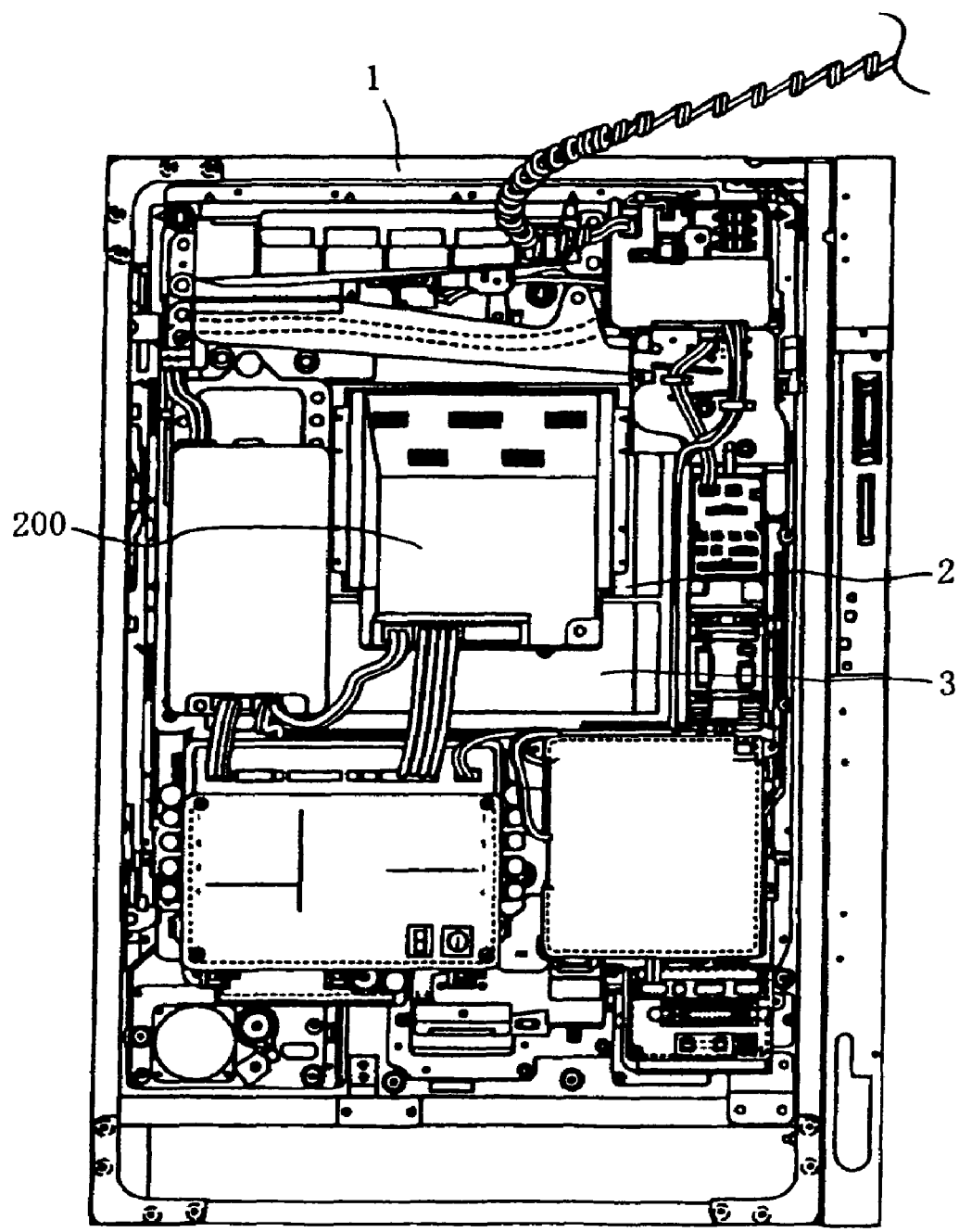
FIG. 17 is a back surface view of a game machine on which the image display box is mounted.

FIG. 17 shows a back surface of the game machine (pinball game machine) 1 in which the image display box 200 including the image display system 220 built therein is mounted to the game machine 1.

A display window (center case) of a screen of the image display system 220 is mounted to the center surface of a game board which forms a game area, and the image display box 200 is mounted to the back surface of the game board via an upper-back surface forming member (mounting base: it may be provided with a guiding channel for prize balls) 2. A lower-back surface forming member 3 is provided with the guiding channel for the prize balls, and covers the back surface side of a grand prize port or a miniature attacker disposed on the game board.

In the case of the pinball game machine, the respective machines are installed on one elongated base, the smaller depth of the image display system 220 and/or the image display box 200 is preferable in order to avoid interference with the adjacent machine. However, if there is no possibility of interference, the light source 231 may be disposed on the rearmost position or behind the lower portion of the lower case 230 of the image display system 220 so that the light source 231 is located at the rearmost position or the rearmost position of the lower portion of the rear cover box 202 of the image display box 200, whereby cooling property and heat releasing property of the light source 231 can be improved.

The embodiments disclosed here are shown as examples only, and are not intended to limit the invention. The scope of the invention is not limited by the description shown above, but by claims, and is intended to include all the modifications having equivalent meanings to the claims without departing the scope of the invention.

The invention claimed is:

1. An image display system for displaying images by allowing a light irradiated from behind to be transmitted therethrough comprising: a front structure for allowing the light to be transmitted therethrough for displaying images; and a rear structure having a light source for emitting a light; the front structure comprising: a Fresnel lens; a liquid crystal display panel unit comprising a liquid crystal display panel with a polarizing plate disposed at least on the back surface thereof and a micro-patterned retarder to be mounted to the rear surface of the polarizing plate on the back surface of the liquid crystal display panel; a diffuser panel disposed on the front surface of the liquid crystal display panel unit; a mounting base member having an opening section of a predetermined size for mounting the Fresnel lens, the liquid crystal display panel unit and the diffuser panel; and a cover member for mounting on the front surface side of the mounting base member, the mounting base member comprising an upright wall having a predetermined height formed with the opening section along the inner periphery of a frame, and a storage formed on the front surface side of the upright wall for storing the liquid crystal display panel unit and the diffuser panel, and a mounting portion for the Fresnel lens formed on the back surface side thereof, the cover member comprising an opening corresponding to the opening section, an abutting portion which abuts against the diffuser panel, the abutting portion formed on the outer peripheral area of the opening at a position opposing to the upright wall in a state in which the liquid crystal display panel unit and the diffuser panel are stored in the storage on the front surface side of the upright wall of the mounting base member and then mounted to the mounting base member, wherein the liquid crystal display panel unit and the diffuser panel can be supported in a depressed state in the fore-and-aft direction at an area comprising the polarizing plate of the liquid crystal display panel by the upright wall of the mounting base member and the abutting portion of the cover member, the liquid crystal display panel unit is formed with a contact area in which the micro-patterned retarder comes into contact with the polarizing plate which is disposed on the back surface of the liquid crystal display panel and non-contact areas which do not come into contact with the polarizing plate and oppose the liquid crystal display panel at end portions with the intermediary of the contact area, and the liquid crystal display panel and the micro-patterned retarder are fixedly bonded to each other at predetermined portions in the non-contact areas.

2. The image display system according to claim 1, characterized in that the rear structure comprises a linear light-emitting source as the light source, a reflecting member, and an enclosure for storing the linear light-emitting source and the reflecting member, the enclosure comprises an upper space positioned behind the Fresnel lens and a lower space positioned below the upper space, the linear light-emitting source is arranged in the lower space in the lateral direction with respect to the liquid crystal display panel so as to emit a light toward the reflecting member, the reflecting member is disposed in the upper space at a predetermined angle so as to reflect the light from the linear light-emitting source toward the Fresnel lens, and the linear light-emitting source is located at a position apart from the Fresnel lens by a predetermined distance via the reflecting member.

3. The image display system according to claim 1, characterized in that the liquid crystal display panel unit is stored in the storage in a state in which the lower surface of the liquid crystal display panel is placed on the upper surface of the bottom plate of the storage, and in this state, the image display surface of the liquid crystal display panel is placed at a portion corresponding to the opening section formed on the mounting base member, and the polarizing plate and the micro-patterned retarder are mounted correspondingly.

4. The image display system according to claim 2, characterized in that the liquid crystal display panel unit is stored in the storage in a state in which the lower surface of the liquid crystal display panel is placed on the upper surface of the bottom plate of the storage, and in this state, the image display surface of the liquid crystal display panel is placed at the portion corresponding to the opening section formed on the mounting base member, and the polarizing plate and the micro-patterned retarder are mounted correspondingly.

* * * * *